(12) United States Patent
Hirsch

(10) Patent No.: US 8,862,876 B2
(45) Date of Patent: Oct. 14, 2014

(54) METHOD AND SYSTEM FOR DELETING DATA

(75) Inventor: Michael Hirsch, Mazkeret Batya (IL)

(73) Assignee: International Business Machines Corporation, Armonk, NY (US)

(*) Notice: Subject to any disclaimer, the term of this patent is extended or adjusted under 35 U.S.C. 154(b) by 685 days.

(21) Appl. No.: 12/942,445

(22) Filed: Nov. 9, 2010

(65) Prior Publication Data

US 2012/0117384 A1 May 10, 2012

(51) Int. Cl.
| | |
|---|---|
| *G06F 21/00* | (2013.01) |
| *G06F 21/62* | (2013.01) |
| *G06F 17/30* | (2006.01) |
| *G06F 3/06* | (2006.01) |
| *G06F 11/14* | (2006.01) |

(52) U.S. Cl.
CPC .......... *G06F 21/62* (2013.01); *G06F 17/30156* (2013.01); *G06F 2221/2143* (2013.01); *G06F 3/0641* (2013.01); *G06F 11/1453* (2013.01); *G06F 17/3015* (2013.01)
USPC ................ 713/167; 713/193; 726/27; 380/45

(58) Field of Classification Search
CPC ............ G06F 17/30156; G06F 3/0641; G06F 11/1453; G06F 17/3015
USPC .......................... 713/167, 193; 726/27; 380/45
See application file for complete search history.

(56) References Cited

U.S. PATENT DOCUMENTS

| | | | |
|---|---|---|---|
| 6,804,781 B1* | 10/2004 | Castro ........................... | 713/193 |
| 6,983,365 B1* | 1/2006 | Douceur et al. ............... | 713/165 |
| 7,519,635 B1 | 4/2009 | Haustein et al. | |
| 7,584,338 B1 | 9/2009 | Bricker et al. | |
| 7,596,696 B1* | 9/2009 | Perlman ........................ | 713/165 |
| 7,900,063 B2* | 3/2011 | Ziv et al. ....................... | 713/193 |
| 8,117,464 B1* | 2/2012 | Kogelnik ....................... | 713/193 |
| 8,364,955 B1* | 1/2013 | Sharma et al. ................ | 713/165 |
| 8,612,439 B2* | 12/2013 | Prahlad et al. ................ | 707/736 |
| 2003/0037248 A1 | 2/2003 | Launchbury et al. | |
| 2004/0153458 A1 | 8/2004 | Noble et al. | |

(Continued)

OTHER PUBLICATIONS

John R. Douceur, Atul Adya, William J. Bolosky, Dan Simon, Marvin Theimer; Reclaiming Space from Duplicate Files in a Serverless Distributed File System, Microsoft Corporation, Jul. 2002, retrieved from http://research.microsoft.com/apps/pubs/default.aspx?id=69954 onOct. 12, 2012.*

(Continued)

*Primary Examiner* — Michael Simitoski
*Assistant Examiner* — Gary Lavelle
(74) *Attorney, Agent, or Firm* — Griffiths & Seaton PLLC

(57) ABSTRACT

A computer system having at least first and second documents, a plurality of decryption keys, and a plurality of data segments stored therein, is provided. Each of the plurality of data segments is decryptable by a selected one of the decryption keys. The decryption keys include a first set of decryption keys associated with the first document and not associated with the second document, a second set of decryption keys associated with the second document and not associated with the first document, and a third set of decryption keys associated with the first document and the second document. The first document is deleted, and in response, the first set of decryption keys is rendered unusable, and the second set of decryption keys and the third set of decryption keys are not rendered unusable.

16 Claims, 7 Drawing Sheets

(56) References Cited

U.S. PATENT DOCUMENTS

| | | | |
|---|---|---|---|
| 2006/0143476 A1* | 6/2006 | McGovern | 713/191 |
| 2008/0155192 A1 | 6/2008 | Iitsuka | |
| 2009/0265399 A1 | 10/2009 | Cannon et al. | |
| 2009/0276514 A1* | 11/2009 | Subramanian | 709/223 |
| 2009/0307251 A1 | 12/2009 | Heller et al. | |
| 2010/0031086 A1 | 2/2010 | Leppard | |
| 2010/0094817 A1 | 4/2010 | Ben-Shaul et al. | |
| 2010/0121825 A1 | 5/2010 | Bates et al. | |
| 2010/0125553 A1 | 5/2010 | Huang et al. | |
| 2010/0161685 A1 | 6/2010 | Jain et al. | |

OTHER PUBLICATIONS

A. Adya, W. J. Bolosky, M. Castro, R. Chaiken, G. Cermak, J. R. Douceur, J. Howell, J. R. Lorch, M. Theimer, R. P. Wattenhofer; FARSITE: Federated. Available, and Reliable Storage for an Incompletely Trusted Environment, Microsoft Corporation, Dec. 2002, retrieved from http://research.microsoft.com/apps/pubs/default.aspx?id=67917 on Dec. 8, 2012.*

Tianming Yang et al., "FBBM: A new Backup Method with Data De-duplication Capability," 2008 International Conference on Multimedia and Ubiquitous Engineering, IEEE 978-0-7695-3134-2/08, 2008, 6 pages.

Tianming Yang et al., "DEBAR: A Scalable High-Performance De-duplication Storage System for Backup and Archiving," IEEE, 978-1-4244-6443-2/10, 2010, 12 pages.

Tin Thein Thwel et al., "An Efficient Indexing Mechanism for Data Deduplication," IEEE, 978-1-4244-5757-1/10, 2009, 5 pages.

Christopher Batten et al., "pStore: A Secure Peer-to-Peer Backup System," (MIT-LCS-TM-632), Dec. 8, 2001, XP002233336, Retrieved on Mar. 4, 2003 from the Internet: URL: http://www.cag.lcs.mit.edu/~kbarr/pstore/pStore.pdf, 12 pages.

* cited by examiner

METHOD AND SYSTEM FOR DELETING DATA

BACKGROUND OF THE INVENTION

1. Field of the Invention

The present invention relates in general to computers, and more particularly to computer systems and computer program products for deleting data in a deduplication system.

2. Description of the Related Art

There is often a desire, and sometimes a regulatory requirement, that after the last copy of some document or file in a computer environment is no longer needed, the stored copies should be destroyed or at least rendered provably inaccessible. Deduplicating (or deduplication) systems by definition store only one copy of data segments that are common to multiple documents, which almost always have different lifecycles.

Common data segments are typically preserved at least until the last copy is needed, irrespective of the lifecycle of the documents that contain the common data. With the deletion of the last document referencing to a particular data segment, the data segment is ideally securely deleted or rendered provably inaccessible. This is very difficult to detect and inefficient to implement in a large system that deduplicates data.

When the last copy of some data segment is no longer needed, the data may be overwritten with a random data pattern. However, this is inefficient and drains bandwidth in busy systems. Alternately, individual common data segments may be tagged with their lifecycle information. However, this greatly increases management costs.

SUMMARY OF THE DESCRIBED EMBODIMENTS

In one embodiment, a method for deleting data in a computing environment is provided. A computer system is provided. The computer system has at least a first document, a second document, a plurality of decryption keys, and a plurality of data segments stored therein. Each of the plurality of data segments is decryptable by a selected one of the plurality of decryption keys. The plurality of decryption keys include a first set of decryption keys, each being associated with the first document and not associated with the second document, a second set of decryption keys, each being associated with the second document and not associated with the first document, and a third set of decryption keys, each being associated with the first document and the second document. The first document is deleted. In response to the deleting of the first document, the first set of decryption keys is rendered unusable, and the second set of decryption keys and the third set of decryption keys are not rendered unusable.

In another embodiment, a computer system is provided. The computer system includes at least one computer-readable medium and at least one processor in operable communication with the at least one computer-readable medium. The at least one computer readable medium has at least a first document, a second document, a plurality of decryption keys, and a plurality of data segments stored thereon. Each of the plurality data segments is decryptable by a selected one of the plurality of decryption keys. The plurality of decryption keys includes a first set of decryption keys, each being associated with the first document and not associated with the second document, a second set of decryption keys, each being associated with the second document and not associated with the first document, and a third set of decryption keys, each being associated with the first document and the second document. The at least one processor is adapted to delete the first document and, in response to the deleting of the first document, render the first set of decryption keys unusable and not render the second set of decryption keys and the third set of decryption keys unusable.

In a further embodiment, a computer program product for deleting data in a computing environment is provided. The computing environment includes at least one computer-readable medium having a first document, a second document, a plurality of decryption keys, and a plurality of data segments stored thereon. Each of the plurality data segments is decryptable by a selected one of the plurality of decryption keys. The plurality of decryption keys includes a first set of decryption keys, each being associated with the first document and not associated with the second document, a second set of decryption keys, each being associated with the second document and not associated with the first document, and a third set of decryption keys, each being associated with the first document and the second document. The computer-readable storage medium further has computer-readable program code portions stored thereon. The computer-readable program code portions include a first executable portion for deleting the first document and a second executable portion for, in response to the deleting of the first document, rendering the first set of decryption keys unusable and not rendering the second set of decryption keys and the third set of decryption keys unusable.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Embodiments of the present invention provide methods, computer systems, and computer program products for deleting deduplicated data in a computer environment, such as a computer system. In one embodiment, the computer system (and/or a computer-readable medium within the computer system) has a first document and a second document stored therein, along with a plurality of decryption (and/or encryption) codes and a plurality of data segments. Each of the plurality of data segments is decryptable by a selected one of the decryption keys. The decryption keys include first, second, and third sets of decryption keys. The first set of decryption keys is associated with the first document and not associated with the second document. The second set of decryption keys is associated with the second document and not associated with the first document. The third set of decryption keys is associated with the first document and the second document. The first document is deleted, and in response, the first set of decryption keys is rendered unusable (e.g., overwritten or deleted), and the second set of decryption keys and the third set of decryption keys are not rendered unusable.

Each data segment is encrypted before storage using a randomly generated key in a way that allows its decryption as long as some source document that contains it has not been deleted. This allows the source document to be read by the user as necessary and to be used as a reference for data deduplication.

In one approach, each source document stores the set of keys for its data segments. When deduplicating a new document using an existing document, the new document stores copies of the keys for data segments that it has in common with the existing document. When deleting a document, its set of keys is destroyed, rendering data unique to it provably inaccessible, while leaving other documents able to access the data segments that were common using their private set of keys.

In another approach, the decryption key is stored with the counter that counts how many documents currently use a data segment. When that counter drops to zero, the key is destroyed, rendering the data segment provably inaccessible.

Figure 1:
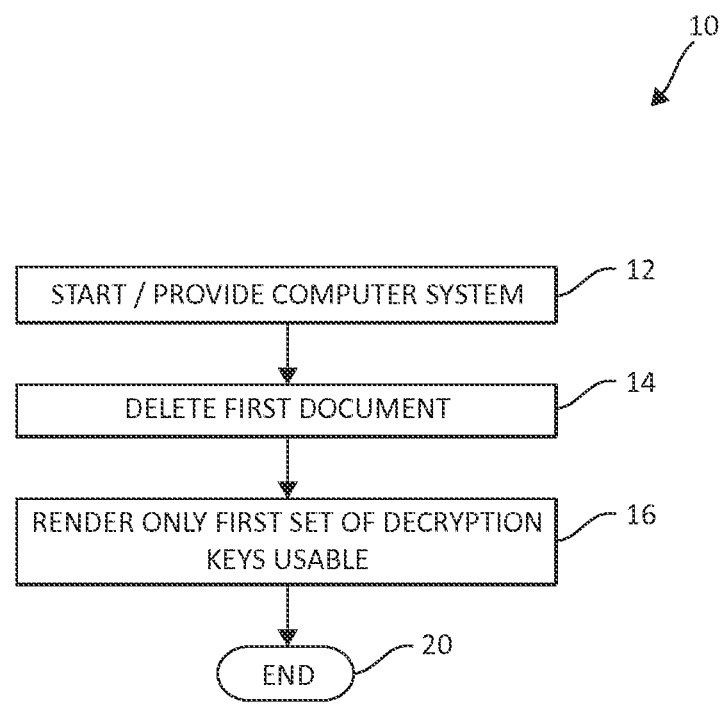
FIG. 1 is a flow chart of a method for deleting data in a computer environment according to an embodiment of the present invention.

FIG. 1 illustrates a method 10 for deleting data in a computer environment according to one embodiment of the present invention. At step 12, the method 12 begins with, for example, a computer system being provided. As will be described in greater detail below, the computer system includes at least one computer-readable medium and at least one processor (or processor device). The at least one computer-readable medium has a first document, a second document, a plurality of decryption keys, and a plurality of data segments stored thereon. It should be understood that "document" may refer to an electronic document as is commonly understood, but may also refer to a file, a data sequence, a chunk, sequences of blocks, sequence of data segments, or the like.

The data segments are each decryptable by a selected one of the plurality of decryption keys. The plurality of decryption keys includes first, second, and third sets of decryption keys. The first set of decryption keys is associated with the first document and not associated with the second document. The second set of decryption keys is associated with the second document and not associated with the first document. The third set of decryption keys is associated with the first document and the second document.

At step 14, the first document is deleted. In response to the deleting of the first document, at step 16, only the first set of decryption keys is rendered unusable. More particularly, at step 16, the first set of decryption keys is rendered unusable while the second set of decryption keys and the third set of decryption keys are not rendered unusable. In one embodiment, the first set of decryption keys is rendered unusable by overwriting the respective portions of the computer-readable medium with random data. In other embodiments, the first set of decryption keys is deleted.

At step 18, the method 10 ends with the data that is unique to the first document no longer being accessible as the decryption keys required to access the data may no longer be used.

Figure 2:
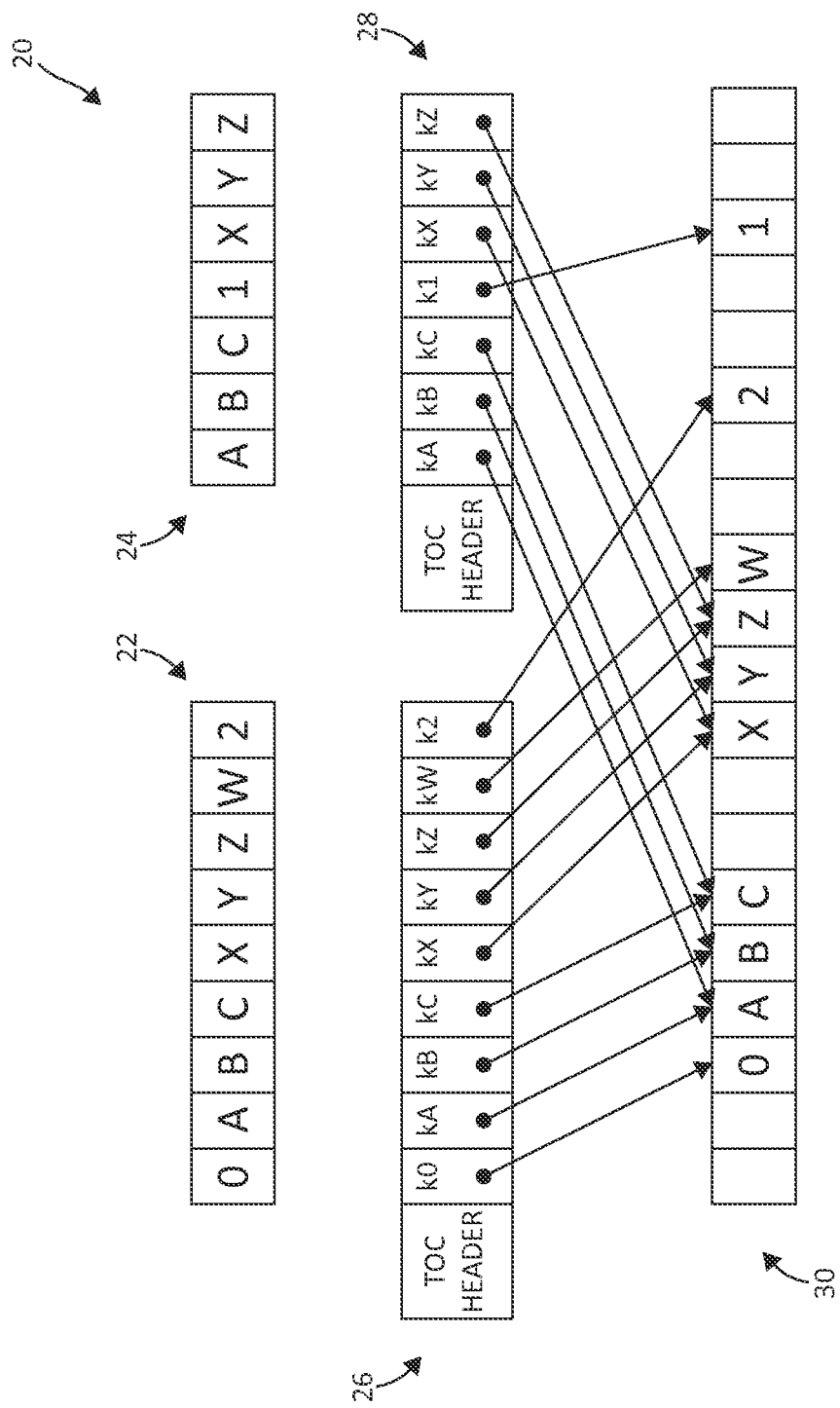
FIGS. 2 and 3 are block diagrams of a method and/or computing system for deleting deduplicated data according to an embodiment of the present invention.
Figure 3:
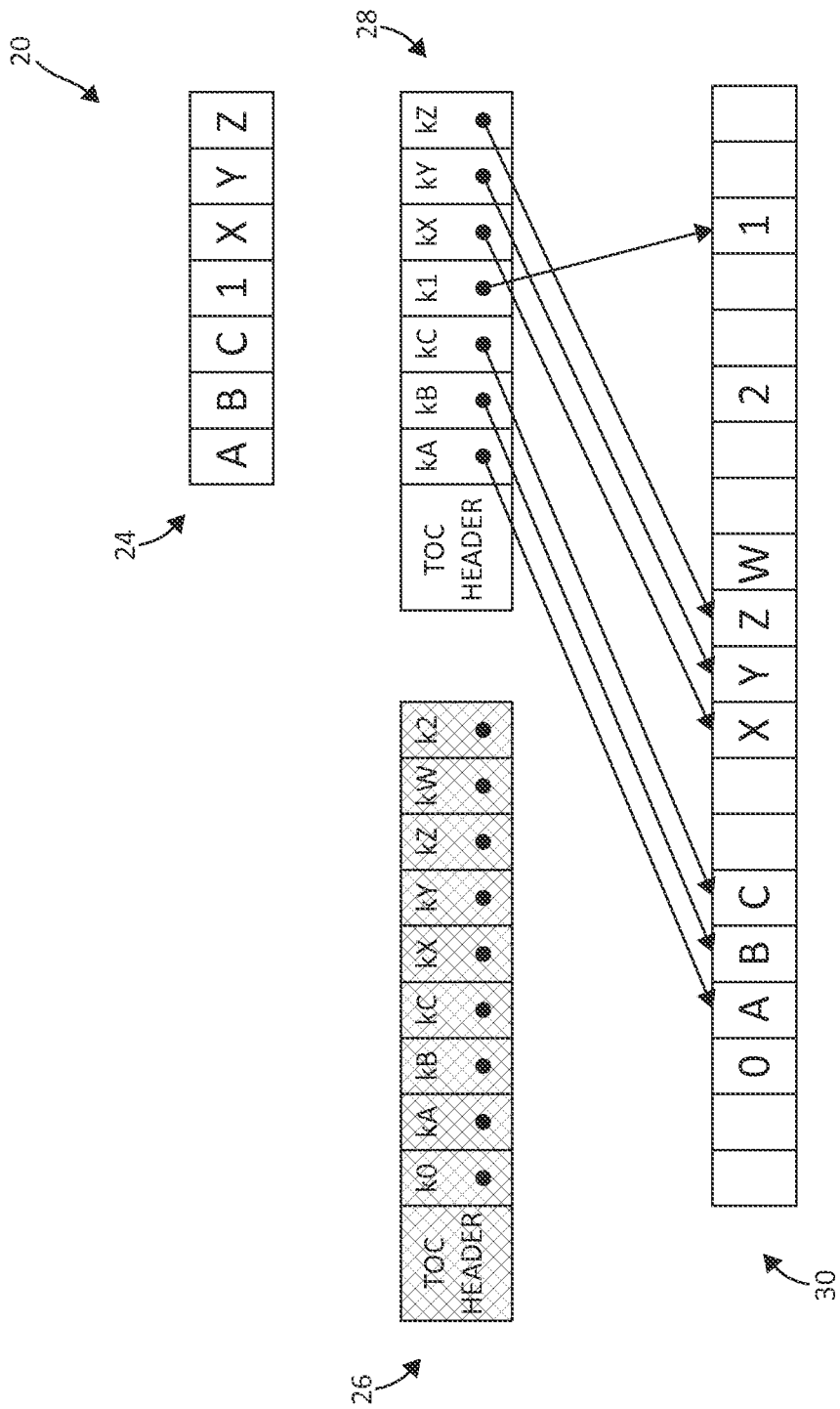

FIGS. 2 and 3 illustrate a computer environment (or system) 20, in block diagram form, along with a method for deleting deduplicated data, according to one embodiment of the present invention. The computer system 20 includes (i.e., stored within the computer system are) a first document 22, a second document 24, a first table of contents 26, a second table of contents 28, and a plurality of data segments 30. As is commonly understood, the first table of contents 26 may be stored within (or be a part of) the first document 22, and the second table of contents 28 may be stored within the second document 24.

As shown in FIG. 2, each of the documents 22 and 24 includes references to particular data segments within the plurality of data segments 30. In particular, the first document 22 includes references to data segments 0, A, B, C, X, Y, Z, W, and 2, and the second document 24 includes references to data segments A, B, C, 1, X, Y, and Z. As such, data segments A, B, C, X, Y, and Z are common to both documents 22 and 24, data segments 0, W, and 2 are unique to the first document 22, and data segment 1 is unique to the second document 24.

Each of the tables of contents 26 and 28 includes a header and a sequence of pointer entries or pointers (i.e., addresses) to where the referenced data segments in the respective document (22 or 24) is stored. In particular, the first table of contents 26 includes pointer entries for data segments 0, A, B, C, X, Y, Z, W, and 2, and the second table of contents 28 includes pointer entries for data segments A, B, C, 1, X, Y, and Z.

Additionally, each of the pointer entries in the first and second tables of contents 26 and 28 includes a decryption (and/or encryption) key for decrypting each of the data segments referenced in the respective document (22 or 24). In particular, the first table of contents 26 includes decryption keys k0, kA, kB, kC, k X, kY, k Z, kW, and k2, and the second table of contents 28 includes decryption keys kA, kB, kC, k1, kX, kY, and kZ.

Although not specifically illustrated, it should be noted that the decryption keys may be divided into three sets: a first set of decryption keys associated only with the first document 22 (or the respective data segments) and not the second document 24, a second set of decryption keys associated only with the second document 24 and not the first document, and a third set of decryption keys associated with both the first document 22 and the second document 24. In the depicted embodiment, the first set of decryption keys includes k0, kW, and k2, the second set of decryption keys includes k1, and the third set of decryption keys includes kA, kB, kC, kX, kY, and kZ.

Still referring to FIG. 2, the plurality of data segments 30 includes the data segments referred to by both the first and second documents 22 and 24. In particular, as is the case with deduplication systems, only one occurrence of each data segment is stored, even if both the first document 22 and the second document 24 includes a reference to it. Thus, the plurality of data segments includes (perhaps among other data segments) one occurrence of data segments 0, A, B, C, X, Y, Z, 2, and 1. As with the decryption keys, the plurality of data segments 30 may be understood to include three sets of data segments: a first set of data segments (i.e., 0, W, and 2) associated only with the first document 22 (and/or the first table of contents 26), a second set of data segments (i.e., 1) associated only with the second document, and a third set of data segments (i.e., A, B, C, X, Y, and Z) associated with both the first and second documents 22 and 24).

It should be understood that the documents 22 and 24, tables of contents 26 and 28, and the plurality of data segments 30 shown in FIGS. 2 and 3 may be stored in a single computer system (and/or a single computer-readable medium) or across multiple computer systems (and/or multiple computer-readable media).

FIG. 3 illustrates the computer environment 20 after the first document 22 is deleted. Upon deleting the first document 22, the first table of contents 26 is destroyed or otherwise rendered unusable, which may be accomplished by overwriting the first table of contents 26 with random data (perhaps multiple times) or by simply deleting the first table of contents 26. Rendering the first table of contents unusable results in the decryption keys within the first table of contents 26 no longer being accessible (i.e., irretrievably destroyed). Thus, the decryption keys (i.e., k0, kW, and k2) required to decrypt the data segments 0, W, and 2, which were unique to the first document 22, are no longer accessible in the computer environment 20. However, it should be noted that the decryption keys in the second table of contents 28, including some that were common to the first table of contents 26 (i.e., kA, kB, kC, kX, kY, and kZ), are still accessible, as the second document 24 (and/or the second table of contents 28) has not been deleted.

Thus, upon deletion of the first document 26, the first set of decryption keys (i.e., those unique to the first document 22) has been rendered unusable, while the second and third sets of decryption keys have not been rendered unusable. As a result, the data segments (i.e., A, B, C, X, Y, Z, and 1) associated with the second and third sets of decryption keys are still accessible, while the data segments (i.e., 0, W, and 2) associated with the first set of decryption keys are not. In other words, similar to the decryption keys, the second and third sets of data segments are accessible, and the first set of data segments is not accessible. To further ensure that the first set of data segments is not accessible, the data segments in the first set of data segments (i.e., 0, W, and 2) may be deleted and/or overwritten in a manner similar to the first table of contents 26. This action of deleting and/or overwriting the data segments is not strictly necessary, however, and will usually be skipped for performance reasons, since these data segments contain encrypted data which is no longer readable since the required decryption key has been destroyed.

Figure 4:
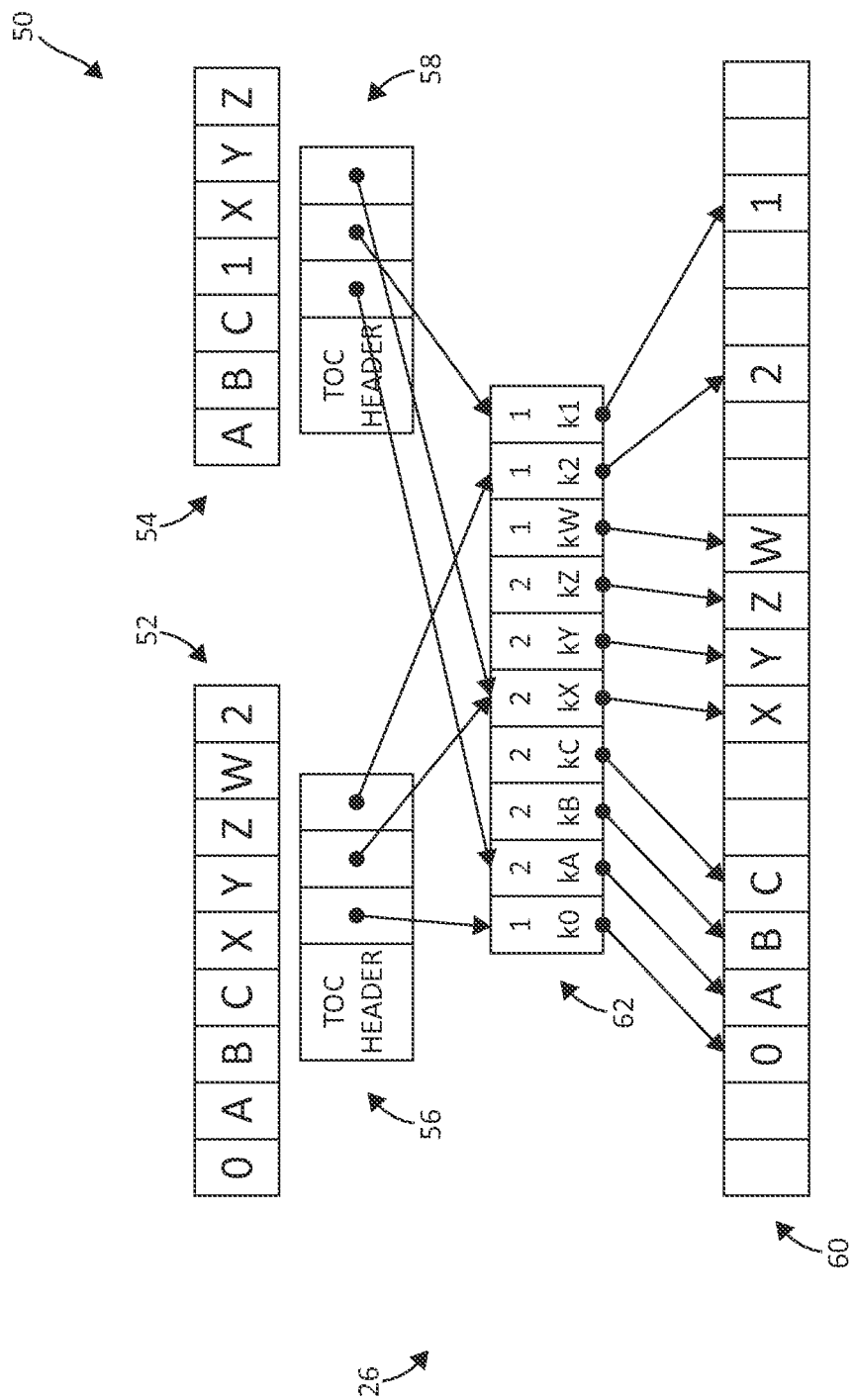
FIGS. 4 and 5 are block diagrams of a method and/or computing system for deleting deduplicated data according to another embodiment of the present invention.
Figure 5:
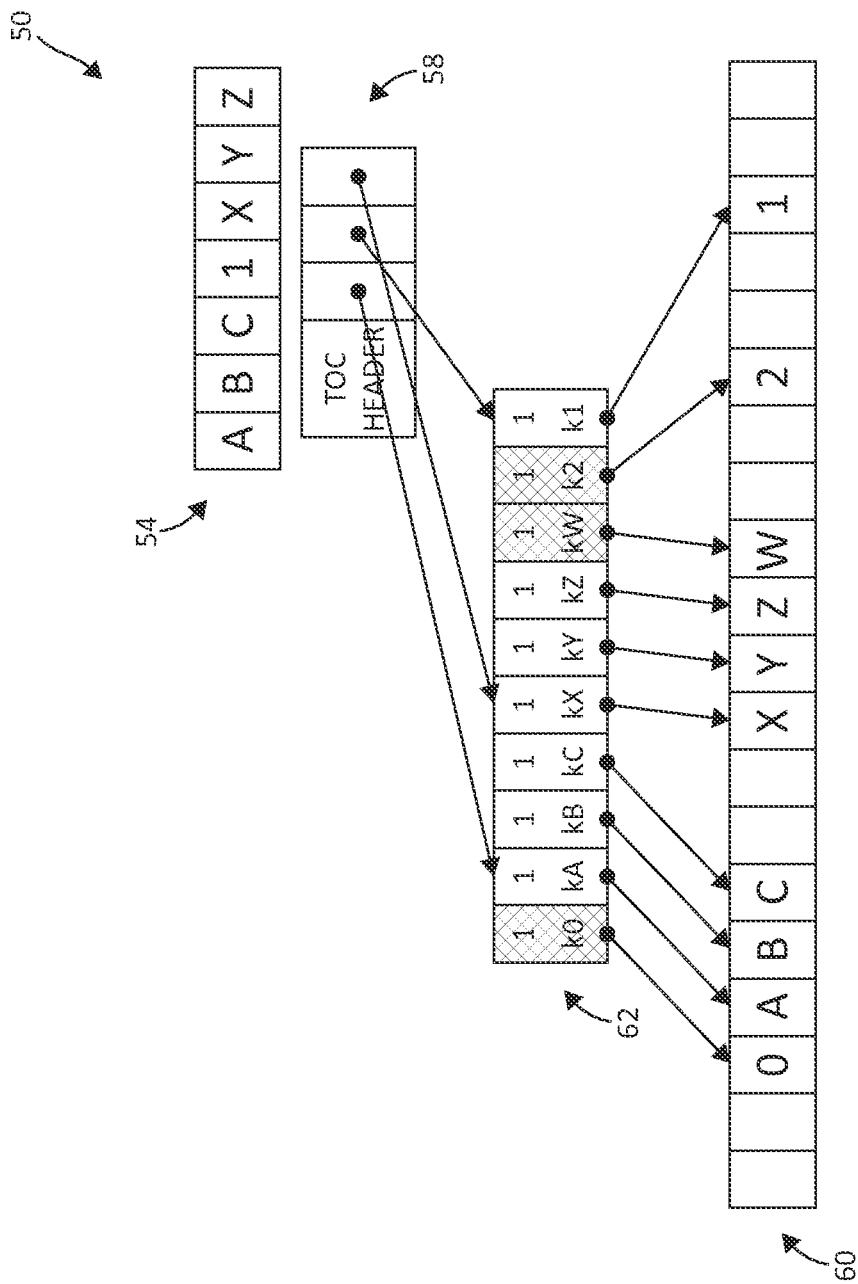

FIGS. 4 and 5 illustrate a computer environment (or system) 50, in block diagram form, along with a method for deleting deduplicated data, according to another embodiment of the present invention. Similar to that shown in FIGS. 2 and 3, the computer system 50 includes (i.e., stored within the computer system are) a first document (or file) 52, a second document 54, a first table of contents 56, a second table of contents 58, and a plurality of data segments 60. However, system 50 shown in FIGS. 4 *and* 5 also includes a logical-to-physical address map (or mapping) 62.

As before, the first table of contents 56 may be stored within (or be a part of) the first document 52, and the second table of contents 58 may be stored within the second document 54. As in the previous embodiment, the first document 52 includes references to data segments 0, A, B, C, X, Y, Z, W, and 2, and the second document 54 includes references to data segments A, B, C, 1, X, Y, and Z. Also, as in FIGS. 2 and 3, the plurality of data segments 60 includes only one occurrence of each of the data segments in the first and second documents 52 and 54.

The logical-to-physical address map 62 provides the translation (or map or mapping) to the actual location of data segments (i.e., on the computer-readable medium). Each entry of the logical-to-physical address map 62 also maintains a reference count (e.g., 0, 1, 2, etc.) of how many documents are currently associated with a particular data segment, as well as includes decryption keys for accessing the particular data segment.

Thus, again the decryption keys may be divided into three sets, with the first set only being associated with the first document 52, the second set only being associated with the second document 54, and the third set being associated with both documents 52 and 54. As shown in FIG. 4, the reference count of the logical-to-physical address map 62 entries associated with the first set of decryption keys is "1," as are those associated with the second set of decryption keys. The reference count of the entries associated with the third set of decryption keys is "2," as these entries are referred to by both the first document 52 and the second document 54.

Referring now to FIG. 5, when the first document 52 is deleted (along with the first table of contents 56), the reference counts of the logical-to-physical address map 62 associated with the first and third sets of decryption keys are decremented (i.e., because the number of referring documents has decreased). Thus, the reference counts for k0, kW, and k2 are lowered to 0, and the reference counts for kA, kB, kC, kX, kY, and KZ are lowered to 1.

When the reference count for any of the logical-to-physical address map 62 entries becomes 0, that entry rendered unusable or destroyed (i.e., overwritten or deleted), as is the decryption key therein. Thus, in the example shown in FIG. 5, the logical-to-physical map 62 entries (and/or decryption keys) k0, kW, and k2 are rendered unusable when the first document 52 is deleted.

As a result, the decryption keys (i.e., k0, kW, and k2) required to decrypt the data segments 0, W, and 2, which were unique to the first document 52, are no longer accessible in the computer environment 50. However, it should be noted that the decryption keys (i.e., k1) unique to the second document 54 and those that were common to the first document 52 (i.e., kA, kB, kC, kX, kY, and kZ), are still accessible, as the second document 54 (and/or the second table of contents 58) has not been deleted.

Thus, upon deletion of the first document 52, the first set of decryption keys (i.e., those unique to the first document 52) has been rendered unusable, while the second and third sets of decryption keys have not been rendered unusable. As a result, the data segments (i.e., A, B, C, X, Y, Z, and 1) associated with the second and third sets of decryption keys are still accessible, while the data segments (i.e., 0, W, and 2) associated with the first set of decryption keys are not. In other words, similar to the decryption keys, the second (i.e., unique to the second document 54) and third (i.e., common to both documents) sets of data segments are accessible, and the first set of data segments is not accessible. To further ensure that the first set of data segments is not accessible, the data segments in the first set of data segments (i.e., 0, W, and 2) may be deleted and/or overwritten in a manner similar to the associated entries in the logical-to-physical map 62. This action of deleting and/or overwriting the data segments is not strictly necessary, however, and will usually be skipped for performance reasons, since these data segments contain encrypted data which is no longer readable since the required decryption key has been destroyed.

Figure 6:
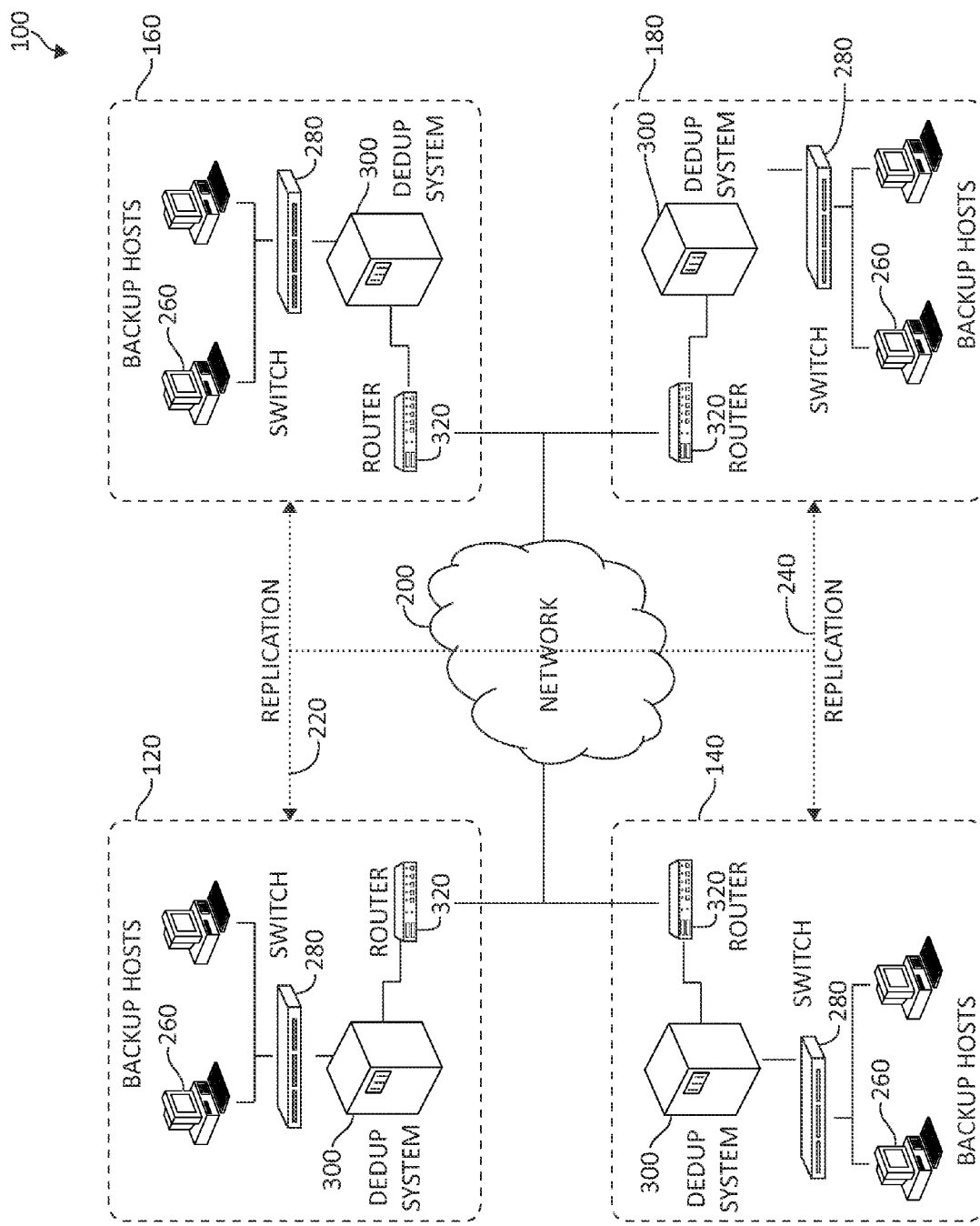
FIG. 6 illustrates an exemplary computing environment in which aspects of the present invention may be implemented.

FIG. 6 illustrates exemplary architecture 100 of deduplication systems and related components in a computing storage environment. The architecture 100 provides storage services to several backup hosts 260. Deduplicated data replication is provided between various deduplication system groups 120, 140, 160, and 180 as indicated by dashed lines 220 and 240. Each of groups 120, 140, 160, and 180 includes one or more hosts 260, which are connected to a deduplication system 300 via networking components such as a switch 280 as indicated. Deduplication systems 300 are interconnected via networking components such as a router 320, which provides internetwork connectivity between groups 120, 140, 160, and 180. A network 200 connects such deduplication systems 300 and routers 320. The network 200 may, in one embodiment, include a wide area network (WAN). In other embodiments, the network 200 may include local area networks (LANs), storage area networks (SANs), and other network topologies known to the skilled artisan. While routers 320 and switches 280 are shown, the skilled artisan will also appreciate that additional and/or substitute networking components are contemplated.

In one embodiment, the switch 280 is compliant with a fibre channel network protocol, making the switch 280 and interconnected components capable of executing commands such as small computer systems interface (SCSI) commands. Such commands may be executed for a variety of storage devices, again as the skilled artisan will appreciate, such as disk drives, tape devices, solid state devices (SSDs), and the like. While the architecture 100 provides one example of components that may be utilized to implement various facets of the present invention and claimed subject matter, the skilled artisan will appreciate that other such architectures are contemplated.

Figure 7:
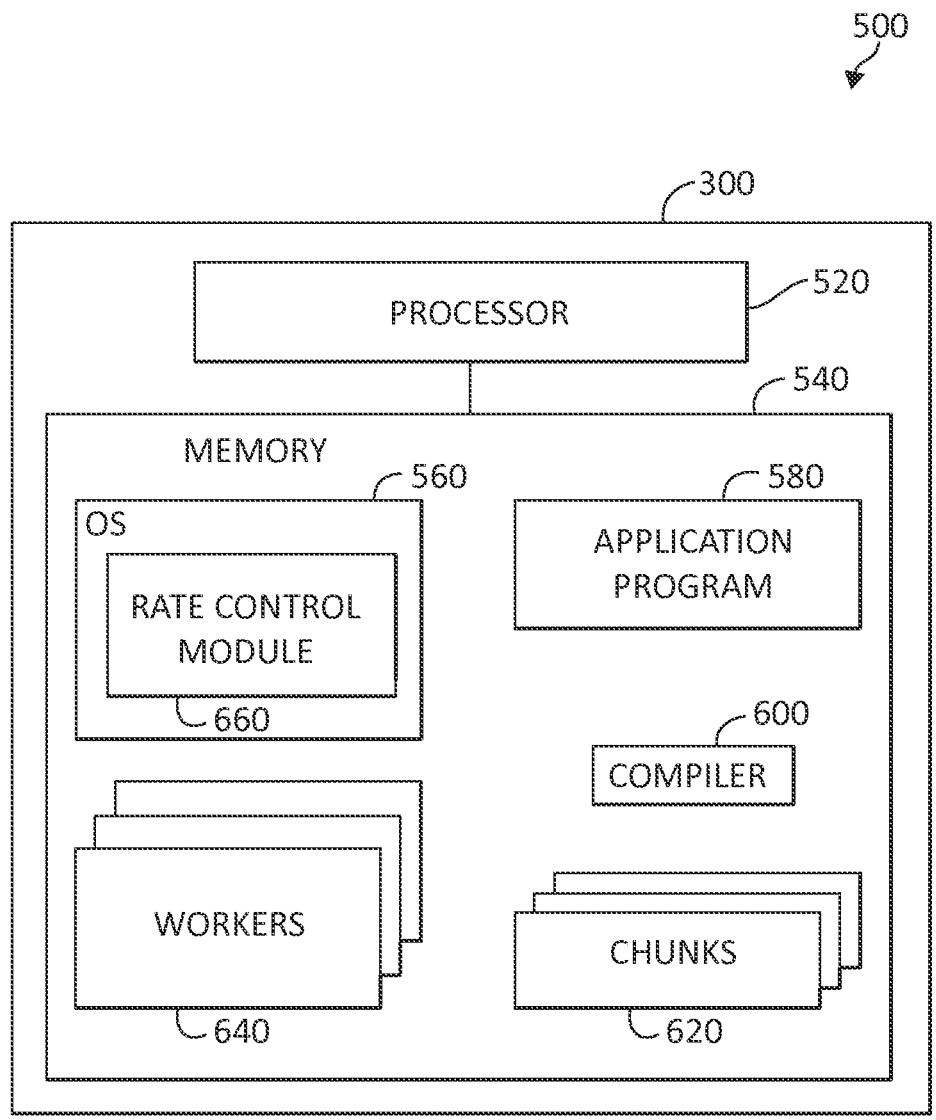
FIG. 7 illustrates an exemplary portion of a deduplication system as illustrated in FIG. 6, previously, including a processor device.

Turning now to FIG. 7, an exemplary portion 500 of a deduplication system 300 as also seen in FIG. 1, previously, is illustrated. The portion 500 of the deduplication system 300 is operable in a computer environment as a portion thereof, in which mechanisms of the above illustrated embodiments may be implemented. It should be appreciated, however, that FIG. 7 is only exemplary and is not intended to state or imply any limitation as to the particular architectures in which the exemplary aspects of the various embodiments may be implemented. Many modifications to the architecture depicted in FIG. 7 may be made without departing from the scope and spirit of the following description and claimed subject matter.

The deduplication system 300 includes a processor 520 and a memory 540, such as random access memory (RAM). The deduplication system 300 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the deduplication system 300.

In the illustrated embodiment, the deduplication system 300 operates under control of an operating system (OS) 560 (e.g. z/OS, OS/2, LINUX, UNIX, WINDOWS, MAC OS) stored in the memory 540, and interfaces with the user to accept inputs and commands and to present results.

The deduplication system 300 may implement a compiler 600 that allows an application program 580 written in a programming language such as COBOL, PL/1, C, C++, JAVA, ADA, BASIC, VISUAL BASIC or any other programming language to be translated into code that is readable by the processor 520. After completion, the computer program 580 accesses and manipulates data stored in the memory 560 of the system 300 using the relationships and logic that was generated using the compiler 600.

To further implement and execute mechanisms and processes according to the present invention, OS 560, in conjunction with the memory 540, the processor 520, the program 580, and other computer processing, networking, and storage components, may implement workers 640 in order to process chunks 620 of deduplicated data. The deduplicated documents processed by the deduplication system 300 may be stored in the memory 540 in a format consistent with the present invention as depicted in diagrams 2 and 4. As the skilled artisan will appreciate, the mechanisms of the workers 640 and the chunks 620 as presently illustrated may be implemented in various forms and architectures. Accordingly, the illustration of the workers 640 and the chunks 620 in the present figure is again intended to demonstrate logical relationships between possible computing components in the deduplication system 300, and not to imply a specific physical structure or relationship.

In one embodiment, instructions implementing the operating system 560, the computer program 580, and the compiler 600, as well as the workers 640 and chunks 620 are tangibly embodied in a computer-readable medium, which may include one or more fixed or removable data storage devices, such as a zip drive, disk, hard drive, DVD/CD-ROM, digital tape, SSDs, etc. Further, the operating system 560 and the computer program 580 comprise instructions (e.g., in executable portions) which, when read and executed by the system 300, cause the system 300 to perform the steps necessary to implement and/or use the present invention. The computer program 580 and/or the operating system 560 instructions may also be tangibly embodied in the memory 560 and/or transmitted through or accessed by network 200 via various components (e.g., router 320, FIG. 6). As such, the terms "article of manufacture," "program storage device" and "computer program product" as may be used herein are intended to encompass a computer program accessible and/or operable from any computer readable device or media.

Embodiments of the present invention may include one or more associated software application programs 580 that include, for example, functions for managing a distributed computer system comprising a network of computing devices, such as a storage area network (SAN). Accordingly, the processor 520 may comprise one or more storage management processors (SMP). The program 580 may operate within a single computer and/or deduplication system 300 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

Although the present invention has been described above on the basis of the embodiment, the technical scope of the present invention is not limited to the above embodiment. It is apparent to those skilled in the art that various modifications or improvements can be added to the above embodiment.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any order unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A computer system comprising:
   at least one non-transitory computer-readable medium having at least a first document, a second document, a plurality of decryption keys, and a plurality of data segments stored thereon, each of the plurality data segments being decryptable by a selected one of the plurality of decryption keys, wherein the plurality of decryption keys comprises
      a first set of decryption keys, each being associated with the first document and not associated with the second document, and
      a second set of decryption keys, each being associated with the second document and not associated with the first document; and
      a third set of decryption keys, each being associated with the first document and the second document; and
   at least one processor in operable communication with the at least one computer-readable medium, the at least one processor:
      deleting the first document; and
      in response to the deleting of the first document, rendering the first set of decryption keys unusable and not rendering the second set of decryption keys and the third set of decryption keys unusable.

2. The computer system of claim 1, wherein the at least one non-transitory computer-readable medium further has a plurality of data segments stored thereon, the plurality of data segments comprising
   a first set of data segments associated with the first document and the first set of decryption keys and not associated with the second document and the second set of decryption keys;
   a second set of data segments associated with the second document and the second set of decryption keys and not associated with the first document and the first set of decryption keys; and
   a third set of data segments associated with the first document, the first set of decryption keys, the second document, and the second set of decryption keys.

3. The computer system of claim 2, wherein the at least one processor is, in response to the deleting of the first document, rendering the first set of data segments unusable and not render the second set of data segments and the third set of data segments unusable.

4. The computer system of claim 3, wherein the rendering of the first set of decryption keys unusable comprises overwriting the first set of decryption keys.

5. The computer system of claim 3, wherein the rendering of the first set of decryption keys unusable comprises deleting the first set of decryption keys.

6. The computer system of claim 2, wherein the first and second documents each comprise a table of contents, and each of the tables of contents further refers to a logical-to-physical address map for each of the plurality of data segments that are associated with the respective documents, wherein the decryption key of each data segment is stored within the logical-to-physical address map.

7. The computer system of claim 6, wherein the at least one processor is, in response to the deleting of the first document, rendering the first set of data segments unusable and not rendering the second set of data segments and the third set of data segments unusable.

8. The computer system of claim 7, wherein rendering a data segment unusable comprises irretrievably destroying the associated decryption key in the logical-to-physical address map.

9. A computer program product for deleting data in a computing environment, the computer program product comprising at least one non-transitory computer-readable storage medium having computer-readable program code portions stored thereon that are executable using a processor device, the computer-readable program code portions comprising:
   a first executable portion for deleting a first document of the computing environment, the computing environment further comprising a second document, a plurality of decryption keys, and a plurality of data segments stored thereon, each of the plurality data segments being decryptable by a selected one of the plurality of decryption keys, the plurality of decryption keys comprising
      a first set of decryption keys, each being associated with the first document and not associated with the second document,
      a second set of decryption keys, each being associated with the second document and not associated with the first document, and
      a third set of decryption keys, each being associated with the first document and the second document; and
   a second executable portion for, in response to the deleting of the first document, rendering the first set of decryption keys unusable and not rendering the second set of decryption keys and the third set of decryption keys unusable.

10. The computer program product of claim 9, wherein the computer system further has a plurality of data segments stored thereon, the plurality of data segments comprising
   a first set of data segments associated with the first document and the first set of decryption keys and not associated with the second document and the second set of decryption keys;
   a second set of data segments associated with the second document and the second set of decryption keys and not associated with the first document and the first set of decryption keys; and
   a third set of data segments associated with the first document, the first set of decryption keys, the second document, and the second set of decryption keys.

11. The computer program product of claim 10, further comprising a third executable portion for, in response to the deleting of the first document, rendering the first set of data segments unusable and not rendering the second set of data segments and the third set of data segments unusable.

12. The computer program product of claim 11, wherein the rendering of the first set of decryption keys unusable comprises overwriting the first set of decryption keys.

13. The computer program product of claim 11, wherein the rendering of the first set of decryption keys unusable comprises deleting the first set of decryption keys.

14. The computer program product of claim 10, wherein the first and second documents each comprise a table of contents, and each of the tables of contents further refers to a logical-to-physical address map for each of the plurality of data segments that are associated with the respective documents, wherein the decryption key of each data segment is stored within the logical-to-physical address map.

15. The computer program product of claim 14, further comprising a third executable portion for, in response to the deleting of the first document, rendering the first set of data segments unusable and not rendering the second set of data segments and the third set of data segments unusable.

16. The computer program product of claim 15, wherein rendering a data segment unusable comprises irretrievably destroying the associated decryption key in the logical-to-physical address map.

* * * * *